(12) United States Patent
Larkins

(10) Patent No.: US 12,458,315 B2
(45) Date of Patent: Nov. 4, 2025

(54) INTENSITY MODULATED X-RAY IMAGING SYSTEMS AND METHODS

(71) Applicant: Grover L. Larkins, Miami, FL (US)

(72) Inventor: Grover L. Larkins, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 195 days.

(21) Appl. No.: 18/425,135

(22) Filed: Jan. 29, 2024

(65) Prior Publication Data

US 2025/0241609 A1    Jul. 31, 2025

(51) Int. Cl.
*A61B 6/00*    (2024.01)
*A61B 6/40*    (2024.01)

(52) U.S. Cl.
CPC ............ *A61B 6/542* (2013.01); *A61B 6/4035* (2013.01)

(58) Field of Classification Search
CPC .......... A61N 2005/1087; A61N 5/1049; A61N 5/10; A61N 5/1077; H05H 7/001; G21K 5/04; A61B 5/055; A61B 5/7285; A61B 5/0507; A61B 6/4064; A61B 6/542; A61B 18/18; A61B 6/4035
See application file for complete search history.

(56) References Cited

U.S. PATENT DOCUMENTS

2016/0070021 A1* 3/2016 Pauly ................... G01N 23/203
                                                            378/87

\* cited by examiner

*Primary Examiner* — Don K Wong
(74) *Attorney, Agent, or Firm* — SALIWANCHIK, LLOYD & EISENSCHENK

(57) ABSTRACT

Systems and methods for X-ray imaging using intensity modulated X-rays are provided. A narrow band filtering system can be used to improve the signal-to-noise ratio (SNR) and contrast of X-ray imaging. Systems and methods can also include a modification to an X-ray tube to permit grid-based intensity modulation and/or a masking scheme for sub-pixels to increase the dynamic range of the resulting pixels. Four different types of X-ray imaging systems can be used and can include intensity modulated X-rays through a narrow band filtering system to improve the SNR and contrast of X-ray imaging.

20 Claims, 9 Drawing Sheets

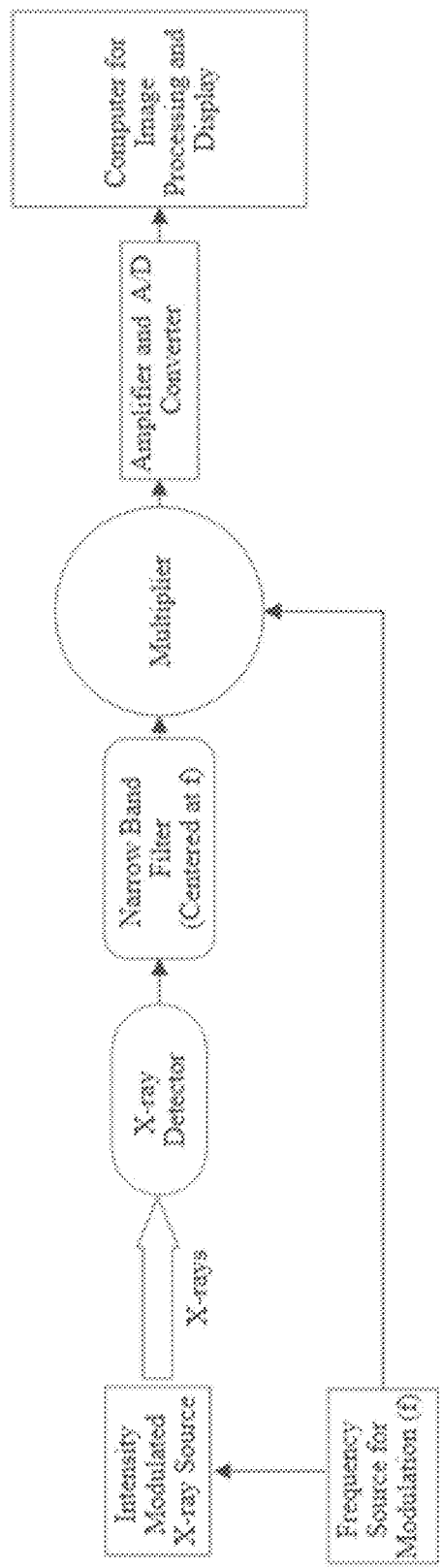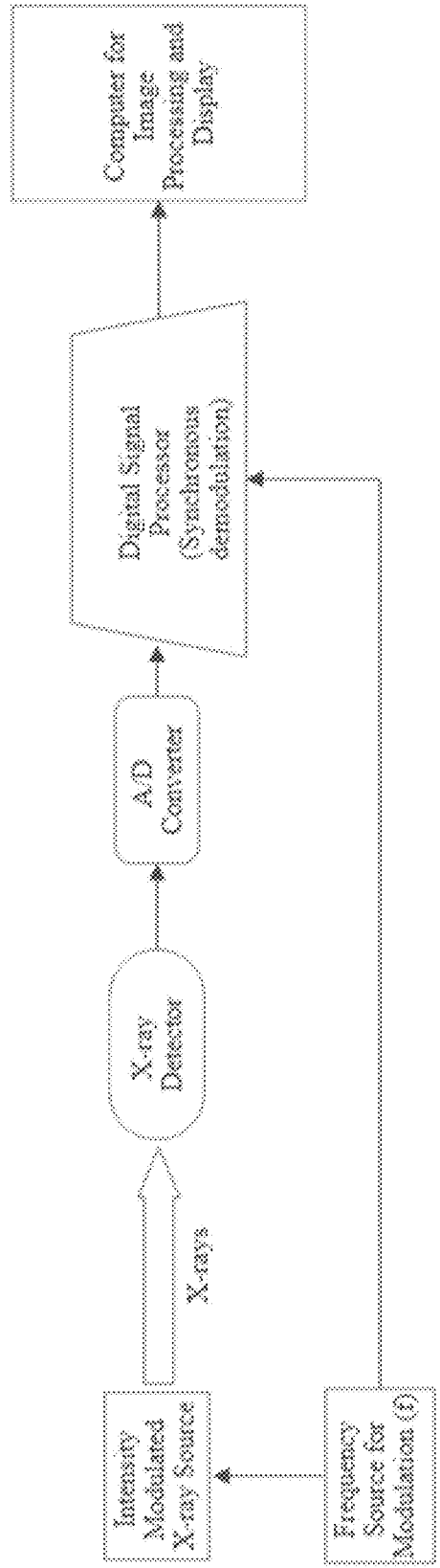
FIG. 4
FIG. 5

INTENSITY MODULATED X-RAY IMAGING SYSTEMS AND METHODS

BACKGROUND

Medical and other X-ray imaging systems have transitioned, from simple X-ray exposure to film methodologies that incorporate a simple uniform illumination with constant intensity X-ray sources that are gated on and off to adjust the total dose on film, to electronic image capture systems where film is no longer utilized. The image is collected by integration of an electronic photo/X-ray sensing array over time in much the same manner as a simple monochromatic digital cameras utilized for still photography functions. The source is still, invariably, a direct current (DC) source that presents a constant or programmed slowly varying intensity and the total non-absorbed transmitted X-ray flux that hits the sensor is integrated over the exposure time to collect the image.

BRIEF SUMMARY

Embodiments of the subject invention provide novel and advantageous systems and methods for X-ray imaging using intensity modulated X-rays. A narrow band filtering system can be used to improve the signal-to-noise ratio (SNR) and contrast of X-ray imaging. Systems and methods can also include a modification to an X-ray tube to permit grid-based intensity modulation and/or a masking scheme for sub-pixels to increase the dynamic range of the resulting pixels. Four different types of X-ray imaging systems can be used and can include intensity modulated X-rays through a narrow band filtering system to improve the SNR and contrast of X-ray imaging.

In an embodiment, a system for X-ray imaging can comprise: an X-ray detector; and an X-ray source configured to provide X-rays towards the X-ray detector. The X-ray source can be further configured to modulate an amplitude of intensity, of the X-rays provided, at a predetermined frequency. The predetermined frequency can be in a range of from, for example, 100 Hertz (Hz) to 20 megahertz (MHz) (e.g., 130 Hz to 10 MHz). The system can further comprise an analog-to-digital (A/D) converter in operable communication with the X-ray detector and configured to convert a signal received by the X-ray detector to a digital signal. The system can further comprise a narrow band filter in operable communication with the X-ray detector and configured to filter the signal received by the X-ray detector before it is converted by the A/D converter. The narrow band filter can be centered at the predetermined frequency. The system can further comprise a multiplier in operable communication with the narrow band filter and configured to multiply the signal received by the X-ray detector before it is converted by the A/D converter and after it is filtered by the narrow band filter. The system can further comprise a digital signal processor (DSP) in operable communication with the A/D converter and configured for either asynchronous demodulation of the digital signal or synchronous demodulation of the digital signal. The X-ray source can comprise a pixel having increased dynamic range (or a plurality of such pixels), the (or each) pixel comprising a plurality of masked sub-pixels each masked differently from each other. The X-ray source can include a frequency source for modulation at the predetermined frequency. The frequency source can be in operable communication with the DSP (e.g., in the case of synchronous demodulation), if present, or the multiplier, if present. The system can further comprise an amplifier and/or a rectifier in operable communication with the A/D converter. The system can further comprise a computer for processing, storage, and/or display of the digital image signal after conversion, demodulation (if performed), amplification (if performed), and/or rectification (if performed).

In another embodiment, a method for X-ray imaging can comprise: providing X-rays through a subject (e.g., a mammalian patient, such as a human patient) and towards an X-ray detector using an X-ray source; and modulating an amplitude of intensity, of the X-rays provided, at a predetermined frequency while providing the X-rays. The predetermined frequency can be in a range of from, for example, 100 Hz to 20 MHz (e.g., 130 Hz to 10 MHz). The method can further comprise using an A/D converter in operable communication with the X-ray detector to convert a signal received by the X-ray detector to a digital signal. The system can further comprise filtering the signal received by the X-ray detector, using a narrow band filter, before it is converted by the A/D converter. The narrow band filter can be centered at the predetermined frequency. The method can further comprise multiplying the signal received by the X-ray detector, using a multiplier, before it is converted by the A/D converter and after it is filtered by the narrow band filter. The method can further comprise using a DSP to demodulate the digital signal, either asynchronously or synchronously. The X-ray source can comprise a pixel having increased dynamic range (or a plurality of such pixels), the (or each) pixel comprising a plurality of masked sub-pixels each masked differently from each other. The X-ray source can include a frequency source for modulation at the predetermined frequency. The frequency source can be in operable communication with the DSP (e.g., in the case of synchronous demodulation), if present, or the multiplier, if present. The method can further comprise amplifying and/or rectifying the signal after it is received by the X-ray detector. The method can further comprise using a computer for processing, storage, and/or display of the digital image signal after conversion, demodulation (if performed), amplification (if performed), and/or rectification (if performed).

BRIEF DESCRIPTION OF DRAWINGS

FIG. 4 shows a block diagram of analog synchronous detection, according to an embodiment of the subject invention. It can use an analog bandpass filter.

FIG. 5 shows a block diagram of digital synchronous detection, according to an embodiment of the subject invention.

DETAILED DESCRIPTION

Figure 1:
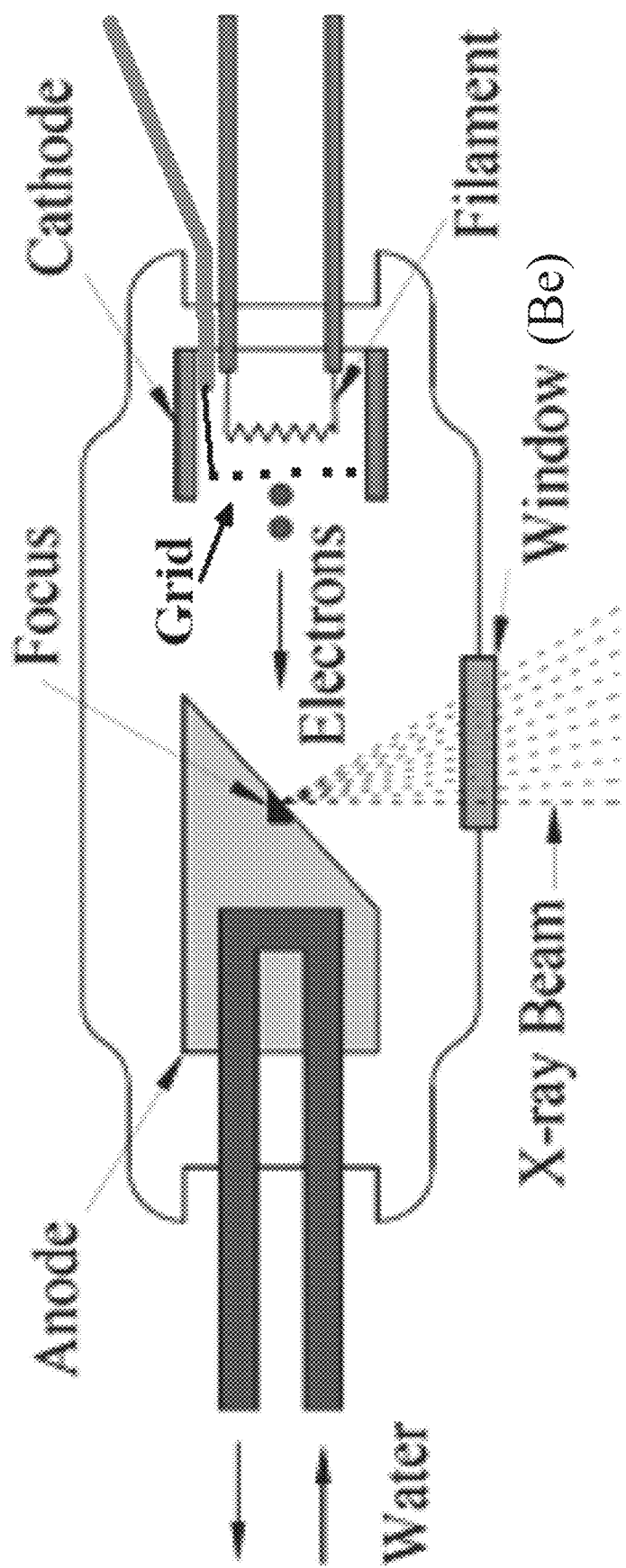
FIG. 1 shows a schematic view of an X-ray tube for modulating using a grid, according to an embodiment of the subject invention. Though FIG. 1 lists certain materials (e.g., beryllium for the window), these are for exemplary purposes only and should not be construed as limiting.

Embodiments of the subject invention provide novel and advantageous systems and methods for X-ray imaging using intensity modulated X-rays. A narrow band filtering system can be used to improve the signal-to-noise ratio (SNR) and contrast of X-ray imaging. Systems and methods can also include a modification to an X-ray tube to permit grid-based intensity modulation and/or a masking scheme for sub-pixels to increase the dynamic range of the resulting pixels. Four different types of X-ray imaging systems can be used and can include intensity modulated X-rays through a narrow band filtering system to improve the SNR and contrast of X-ray imaging.

The X-ray source in existing X-ray imaging systems is a direct current (DC) source that presents a constant or programmed slowly varying intensity and the total non-absorbed transmitted X-ray flux that hits the sensor is integrated over the exposure time to collect the image. This can give rise to issues with quantum noise and background noise both being included in the collected signal, leading to degradation in image quality, contrast, and resolution requires increased exposure or use of a greater amount of contrast enhancing agent (opaque dye) to attempt to overcome in the related art, neither of which is desirable. Embodiments of the subject invention address the issues with quantum noise and background noise differently, without requiring increased exposure or use of a greater amount of contrast enhancing agent.

Systems and methods of embodiments of the subject invention can modulate the amplitude of the X-ray source's intensity at a predetermined frequency (e.g., in the range of from 130 Hertz (Hz) to several megahertz (MHz), such as from 130 Hz to 10 MHz (or about 10 MHz)) while collecting a rapid response amplitude modulated signal from the X-ray sensor. The collected signal can be run through a filter (digital or analog) to separate out only the signal with the same frequency as the source modulation. In electronic systems, noise is proportional to the signal bandwidth, and noise is also sporadic (hence yielding a Fourier Transform of an impulse function and occupying all frequencies within a system's pass band). In a simple time integrating detection system this presents as a DC signal. In a modulated source/synchronous or frequency coherent system the desired signal is now a single frequency alternating current (AC) signal. This provides the ability to narrow the bandwidth of the received X-ray signal. Because the noise is proportional to the bandwidth, the ability to reduce the received bandwidth can greatly increase the SNR. This increased SNR can permit either the use of a smaller total X-ray dose to achieve the same contrast/resolution or the same dose to yield much improved images with increased contrast and resolution, thus making a significant improvement compared to the related art in X-ray based imaging.

Multiple general paths can be used to functionally implement a narrowband modulated X-ray imaging system according to embodiments of the subject invention. These include: (1) an analog filtering approach with final analog to digital (A/D) conversion after analog filtering; (2) an analog filtered synchronous detection system where a sample of the modulating signal is used to lock in the detector; (3) an all-digital digital signal processor (DSP)-based filtering approach; and (4) an all-digital DSP synchronous detection system where the DSP is fed a sample of the modulating signal and a digital lock in amplifier system is implemented. Further, an enhanced dynamic range pixel can be used, which can include several sub-pixels with varying levels of X-ray opaque masking. Any reference herein to a "sensor" or "pixel" should be construed to include either or both of the classical photodiode/complementary metal oxide semi-conductor (CMOS)/phototransistor sensor as well as an increased dynamic range sub-pixelated sensor/pixel.

In many embodiments, the X-ray system can include an X-ray source configured to be modulated. Some X-ray sources can be slowly modulated by varying the electron current on the anode of the generating tube to maintain a sort of "autoexposure" function in a camera. However, in embodiments of the subject invention, such an electron beam current can be modulated at frequencies well into the 10 kilohertz (kHz) and MHz or 10 MHz range. This has been done in cathode ray tubes for displays, in which the electron beam can have its intensity modulated by modulation of the electron-beam-generating tube's cathode bias while keeping the individual electron energies constant. This then modulates the current, but because the individual electron energies are all the same, it keeps the X-ray emission spectrum and wavelength unchanged. Thus, the X-ray intensity varies in time at the same rate as the electron beam current with the X-ray photons all continuing to have the same wavelength. Two methods of X-ray source modulation include cathode modulation where the cathode is driven with an AC signal in addition to the DC bias used to generate X-rays in a traditional X-ray tube and a grid modulated triode, tetrode, or pentode type of tube where the grid(s) is (are) driven by the AC signal to generate a modulated electron beam intensity incident on the anode. FIG. 1 shows a schematic view of a modulated triode source that can be used in X-ray systems of embodiment of the subject invention; this type of source can be used with analog filtering, analog synchronous detection, DSP filtering, and DSP-based synchronous detection. This type of source can also be used with the increased dynamic range pixels including masked sub-pixels.

The detection system can use either: (a) an analog amplifier for each pixel of the image and a filter that only passes the frequency of the beam modulation and then an amplitude modulation (AM) detector/integrator; or (b) an A/D data acquisition system (e.g., including an A/D converter) operating at a sampling rate considerably higher than the modulation signal ($f_{A/D} > [2 \times f_{Modulation}]$ due to the Nyquist criterion) can be used to sample each pixel of the image (where $f_{A/D}$ is the sampling frequency of the A/D data acquisition system and $f_{Modulation}$ is the frequency of the modulation signal). For case (b), in an A/D-based system, the A/D converter can sample at a rate of at least 10 times the modulation frequency. Also, the modulation frequency can be at a multiple of 130 Hz and not at a multiple of either 50 Hz or 60 Hz to avoid power line pickup. In fact, any frequency that is not a multiple of 50 Hz or 60 Hz and that is sufficiently above the Nyquist limit can be used. In case (b), once acquired, the digital signal can be digitally filtered to select only the frequency component of the modulating signal in a DSP chip and the resulting value can be converted to a digital intensity number and processed to form an image, as is standard in a standard digitally (computer) driven video screen or printer. This technique is quite flexible as it may be mostly or completely all done in software. In case (a), an A/D conversion at a single pass, slow rate, can be used to digitize the pixel information that was analog detected, filtered, and reduced to a DC value. This resulting value can be converted to a digital intensity number and processed to form an image, as is standard in a standard digitally (computer) driven video screen or printer. The advantage of this technique is that the A/D conversion is much slower and computationally less demanding. The disadvantage is that it is locked to the analog filter frequency and is somewhat inflexible. Digital high speed camera systems with burst frame rates of $10^7$ frames per second exist and are more than fast enough to be used in systems of embodiments of the subject invention. In fact, other image sensors (e.g., GdI:Ce scintillators) can be more than adequate for $10^6$ frame per second rates and tend to match well with the spectral sensitivity of existing cameras with very low afterglow levels at 1,000 nanoseconds (ns) pulse repetition rates (frame rates).

Following are functional descriptions of these topologies: (1) an analog filtering approach with final A/D conversion after analog filtering; (2) an analog filtered synchronous detection system where a sample of the modulating signal is used to lock in the detector; (3) an all-digital DSP-based filtering approach; and (4) an all-digital DSP synchronous detection system where the DSP is fed a sample of the modulating signal and a digital lock in amplifier system is implemented.

1. Analog Filter Followed by A/D Conversion and Display

Figure 2:
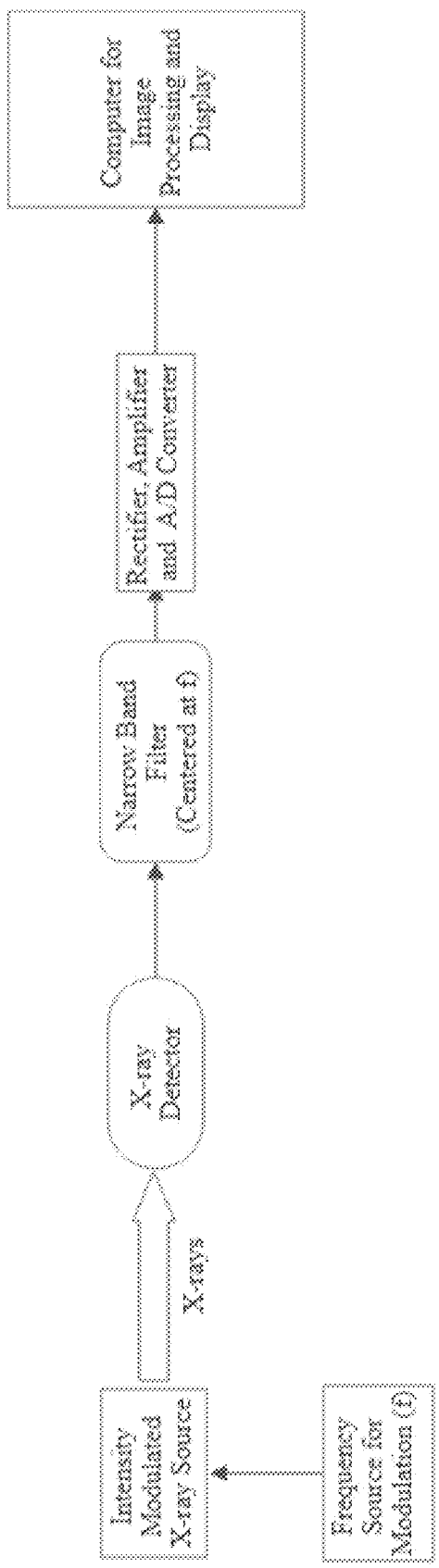
FIG. 2 shows a block diagram of all analog filter asynchronous conversion, according to an embodiment of the subject invention.
Figure 6:
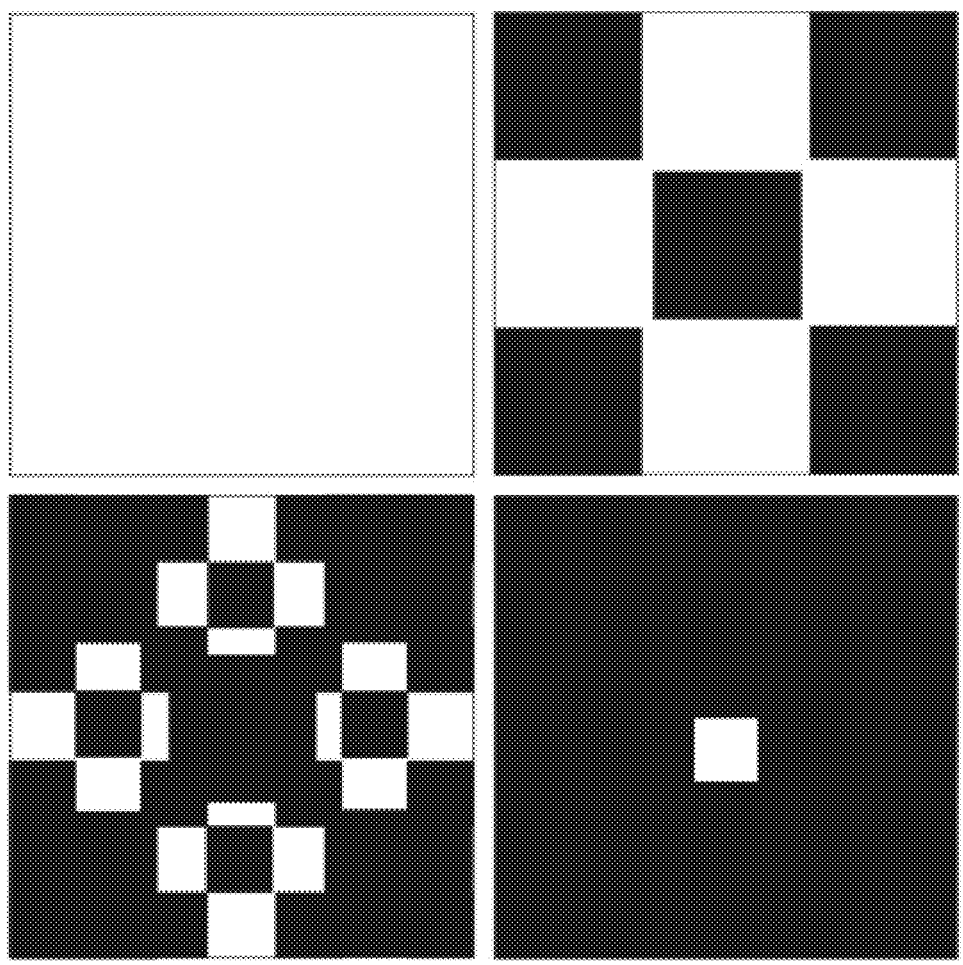
FIG. 6 shows an example of a four sub-pixel density mask, illustrating an example of a percentage masking sub-pixel array. The sub-pixels have 0 (top left), 0.444 (top right), $8/49$ (bottom left) and $1/49$ (bottom right) masking.

FIG. 2 shows a block diagram for this topology. In the topology where the filtering is done using an analog filter, the modulation signal can be generated using a stable oscillator and amplifier chain, and this signal can be used to modulate the X-ray tube's electron beam's intensity either by direct cathode modulation or by grid modulation (grid modulation is depicted in FIG. 1). The intensity modulated X-rays that are generated can be directed through the subject (e.g., a patient, such as a mammalian patient (e.g., a human patient)) and detected using an X-ray sensitive photosensor array. This array can be either a masked subpixel array (e.g., as depicted in FIG. 6) or a standard two dimensional or mechanically scanned linear array.

The output of each photosensor can then be fed through an analog narrow bandwidth bandpass filter. This filter can determine the bandwidth of the received signal and thus define the noise bandwidth of the signal. This noise bandwidth (BW) can then determine the system noise as $P_{Noise}=k_B*T*(BW)$, where $P_{Noise}$ is the noise, $k_B$ is the Boltzmann constant, T is the temperature of the filter, and BW is the noise bandwidth. This filtered signal can then be passed to the A/D converter(s), digitized, and manipulated further using DSP, which can enhance contrast, clip, and prepare the digitized signal for the computer that will store and display the data. The computer can also be used here to add false color, enhance contrast, and/or automatically highlight features and/or abnormalities in the scan.

2. A/D Conversion, DSP Filtering and Display

Figure 3:
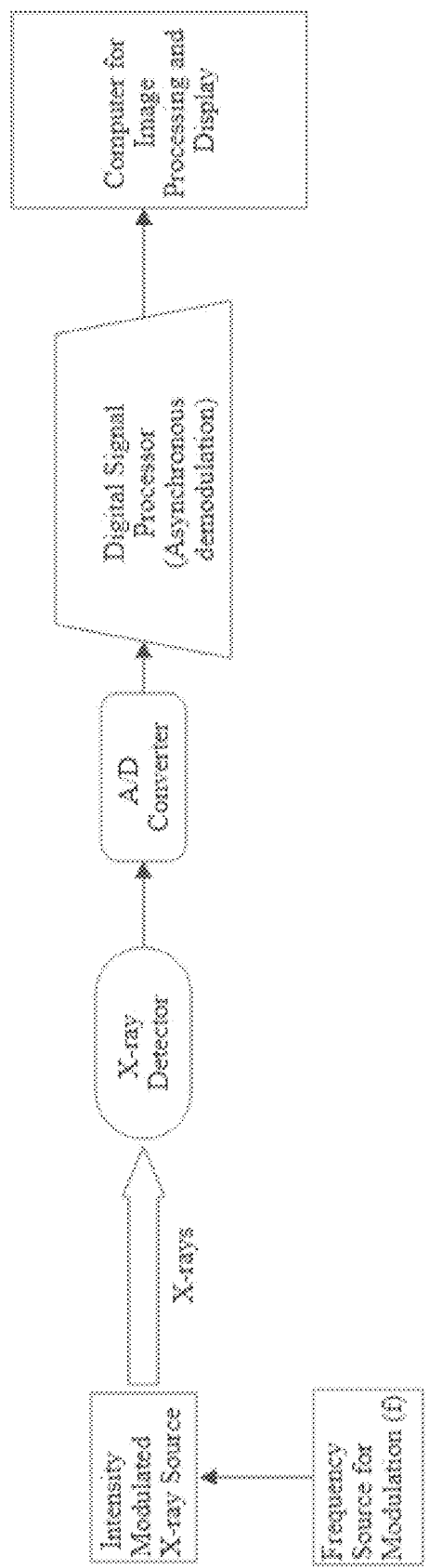
FIG. 3 shows a block diagram of asynchronous detection and a digital signal processor (DSP)-based bandpass filter, according to an embodiment of the subject invention.

FIG. 3 shows a block diagram for this topology. In the topology where the signal from the sensors is converted to digital form using the A/D converter prior to filtering, the modulation signal can be generated using a stable oscillator and amplifier chain, and this signal can be used to modulate the X-ray tube's electron beam's intensity either by direct cathode modulation or by grid modulation (grid modulation is depicted in FIG. 1). The intensity modulated X-rays that are generated can be directed through the subject and detected using an X-ray sensitive photosensor array. This array can be either a masked subpixel array (e.g., as depicted in FIG. 6) or a standard two dimensional or mechanically scanned linear array.

The output of each photosensor can then be fed to the A/D converter(s) where it is digitized and a DSP can be used to perform narrow bandpass filtering. The output can then be manipulated further using the DSP to enhance contrast, clip, and prepare the digitized signal for the computer that will store and display the data. The DSP filter can determine the bandwidth of the received signal and thus define the noise bandwidth of the signal. This noise bandwidth (BW) can then determine the system noise as $P_{Noise}=k_B*T*(BW)$. This digitized, DSP processed data can then be sent to the computer for storage and display. The computer can also be used here to add false color, enhance contrast, and/or automatically highlight features and/or abnormalities in the scan. The main difference from the analog filtering topology (topology 1 above) is that the filtering has been moved to the DSP after the A/D conversion with a concomitant increase in signal processing resources required.

3. Analog Synchronous Detection

FIG. 4 shows a block diagram for this topology. The analog synchronous detection topology can insert a multiplier stage after the analog filter compared to the analog filtering topology (topology 1 above). The analog signal from the photosensor(s) can be multiplied with the signal used to modulate the X-ray intensity and then subjected to a very sharp AC blocking lowpass filter. Because the resulting signal is extremely narrow in bandwidth, this sets the noise bandwidth (BW) to an extremely small value. This DC signal can then be passed to an A/D converter, and a DSP can be used to further improve the SNR, improve the contrast, and/or perform clipping (if desired). This digitized, DSP processed data can then be sent to the computer for storage and display. The computer can also be used here to add false color, enhance contrast, and/or automatically highlight features and/or abnormalities in the scan.

4. DSP Based Synchronous Detection

FIG. 5 shows a block diagram for this topology. The DSP synchronous detection topology can sample the signal modulating the X-ray tube in the DSP unit and then multiply it digitally with the A/D converted sensor signal, followed by applying the appropriate AC rejection DSP filtering to separate the DC signal into an extremely narrow bandwidth (BW) signal for further processing (e.g., clipping, image enhancement, noise reduction, etc., as desired). This digitized, DSP processed data can then be sent to the computer for storage and display. The computer can also be used here to add false color, enhance contrast, and/or automatically highlight features and/or abnormalities in the scan.

Enhanced Contrast Using Masked Sub-Pixels

Embodiments of the subject invention can include a mechanism for increasing the effective dynamic range of the electronic sensors used to detect X-rays or high energy photons, which can include dividing each "pixel" into a number of sub-pixels. Each sub-pixel can be masked by a mask with a different opacity. This variation can be achieved through a number of means. It can be done using X-ray absorbing material with a different thickness above the active sensing area of each sub-pixel, by using a different material with a different absorption coefficient above each sub-pixel's active sensing area, or by covering a different percentage of the sub-pixel's active sensing area with an X-ray opaque mask. FIG. 6 illustrates the opaque masking technique where each sub-pixel has a different area that is open and does not occlude X-rays from the active sensing region of the sub-pixel. Any variation of these techniques either alone or in concert with each or any of the others can be utilized to achieve this making of sub-pixels of different sensitivity to X-ray flux.

The intent of this masked sub-pixel concept is to extend the effective dynamic range of a pixel by making each pixel out of multiple sub-pixels where one sub-pixel has a maximized sensitivity with no absorption and the other sub-pixels have step wise less sensitivity. For example, consider the sub-pixel without any absorption to have a sensitivity of 100 in arbitrary units, the next most sensitive sub-pixel to have a sensitivity of 50 in the same units, the third most sensitive sub-pixel to have a sensitivity of 25 in those same arbitrary units, and so on. Another way to look at it is that one sub-pixel has 100% transmission, the next has 50%, the third has 25% transmission, and so on. Each sub-pixel can be amplified to bring them all to the same value prior to being converted into digital form in the "N" bit A/D converter. Each sub-pixel's bit depth can therefore be identical but an X-ray flux that would saturate the output of the unobstructed sub-pixel would be easily readable on the second, third, and fourth sub-pixels without saturation. In the DSP unit this signal could then be combined to give an effective bit depth (in this case, of N+3). This can lead to a digital dynamic range or bit depth for the signal of $2^{N+3}$ bits while maintaining a family of "N" bit A/D converters in the system. This would lead to 8 times the contrast range at the expense of 4 times the area.

A step size of a factor of 2 in sensitivity is not the only choice here, as the step size is arbitrary and only limited by the accuracy with which the opacity variation can be accomplished. For example, a step size of 10 for each of four sub-pixels (100%, 10%, 1% and 0.1% transmission) would increase the resolution by $10^3 2^N$ where the only consideration would be that $2^N$ must exceed the transmission step of the mask. Hence, in this example with a step size of a factor of 10, N would have to equal or exceed 4.

Equations 1a and 1b below can be used to determine the minimum number of A/D bits when using a subpixel scheme according to an embodiment of the subject invention.

$$N = \text{Integer Part}\{1 + (\log_{10}(\text{step size})/\log_{10}(2)\} \quad \text{Equation (1a.)}$$

or $$N = \text{Integer Part}\{1 + \log_2(\text{step size})\} \quad \text{Equation (1b.)}$$

Bandwidth Comparison of a 1/60-Second Rectangular Pulse Versus a Sine Wave

Figure 7:
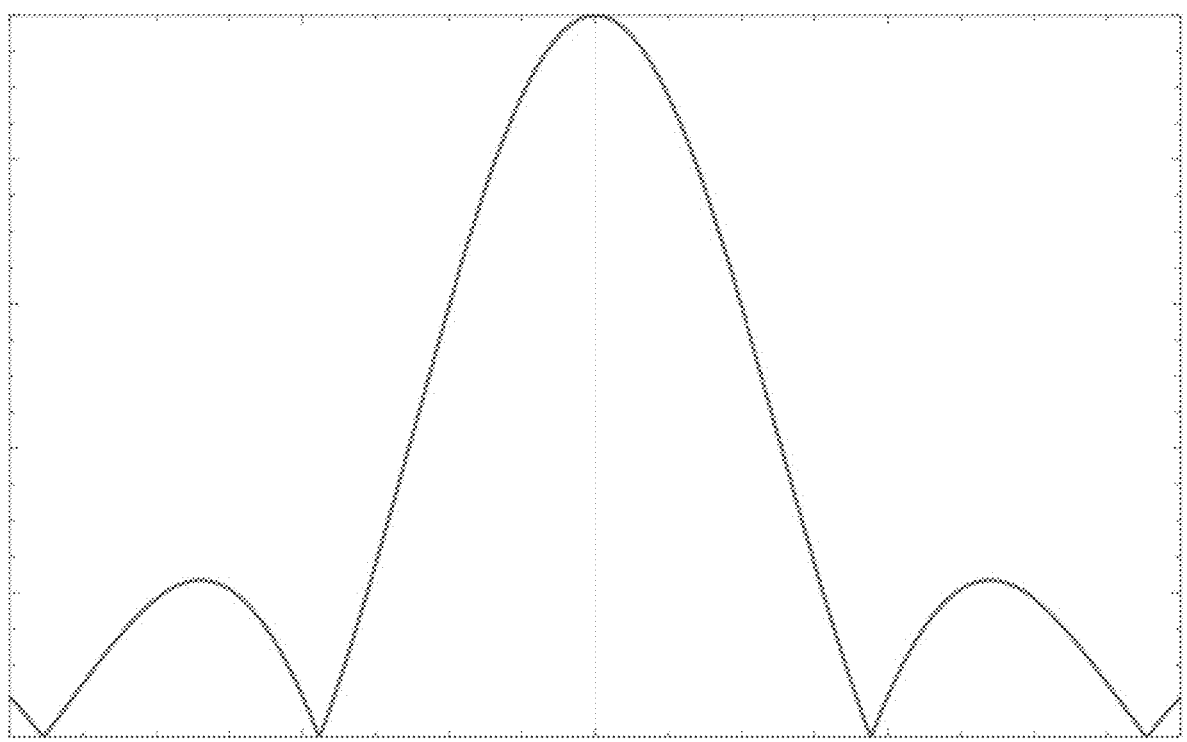
FIG. 7 shows a magnitude of Fourier transform of a unit rectangle function with a width of $1/60$ of a second. The view width is 800 Hertz (Hz).
Figure 8:
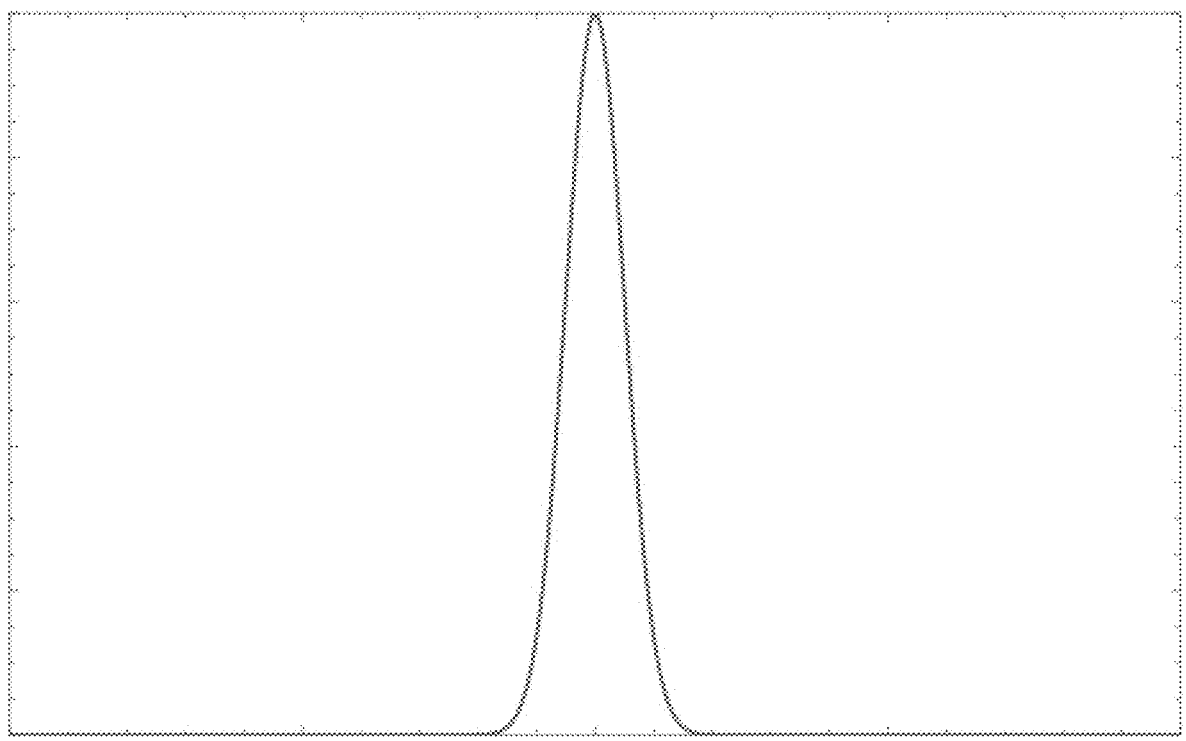
FIG. 8 shows a magnitude of a Gaussian function with a standard deviation of 0.5 Hz, centered at 400 Hz. The view width is 20 Hz.

FIG. 7 shows the Fourier transform of a 1/60-second rectangular pulse, and FIG. 8 shows a Gaussian with a standard deviation of 0.5 centered at 400 Hz. Referring to FIGS. 7 and 8, the clear difference between the two widths can be seen. The Gaussian approximates a Q of 400 in a DSP bandpass implementation, which can be readily achieved in a DSP filter. By this metric the noise would be reduced by a factor of well in excess of 200, or 43 decibels (dB). In essence, this would be a gain in resolution (contrast gradation) of seven photographic stops making the linear detection minimum discernible size reduce by a factor of 400 and the minimum discernible volume reduce by a factor of approximately 8 million.

This narrowing of the bandwidth for noise, presuming that subject detail obscuration is not a factor, is key for increasing resolution or required X-ray dose (they can be traded back and forth as required for optimum results).

Example Implementations

Figure 9:
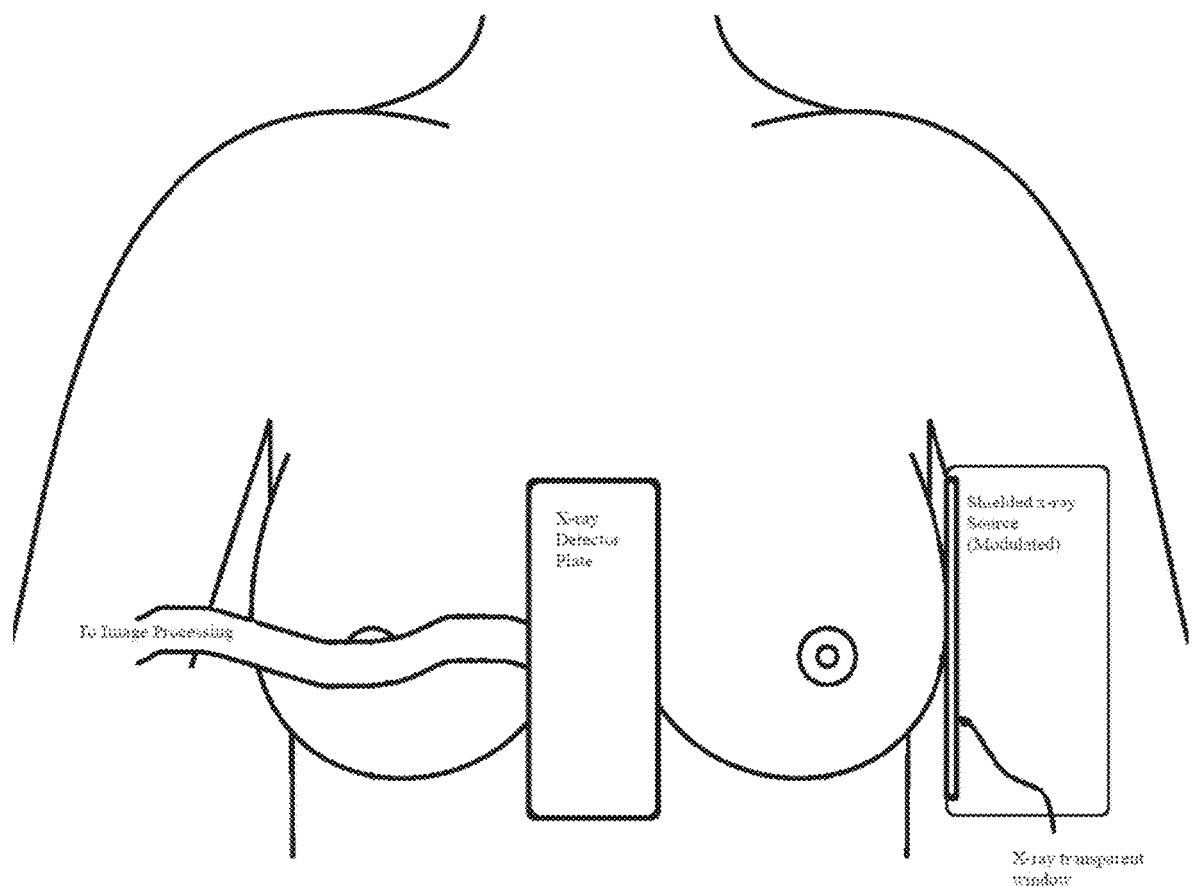
FIG. 9 shows a schematic of a modulated X-ray source being used for a front X-ray of a breast, according to an embodiment of the subject invention. The breast can be compressed between the detector and the source (it is depicted as uncompressed in FIG. 9 for clarity). The shield permits larger area exposure while reducing extraneous exposure to the patient.
Figure 10:
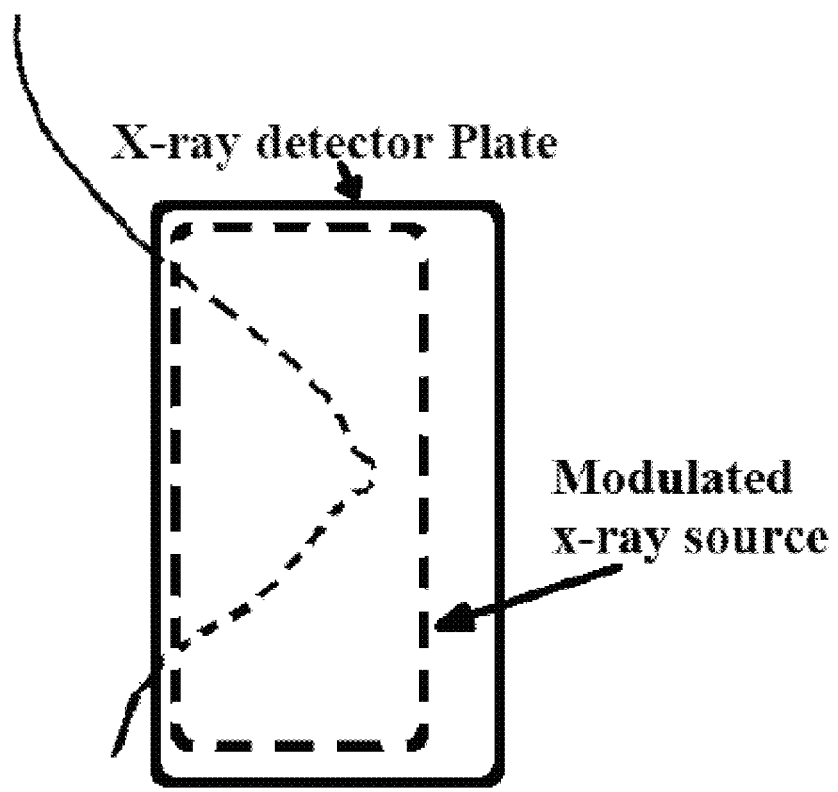
FIG. 10 shows a schematic of a modulated X-ray source being used for a lateral X-ray of a breast, according to an embodiment of the subject invention. The image speed can be, for example 10,000 frames per second, with modulation at, for example, 130 Hz (or about 130 Hz) sine wave intensity.
Figure 11:
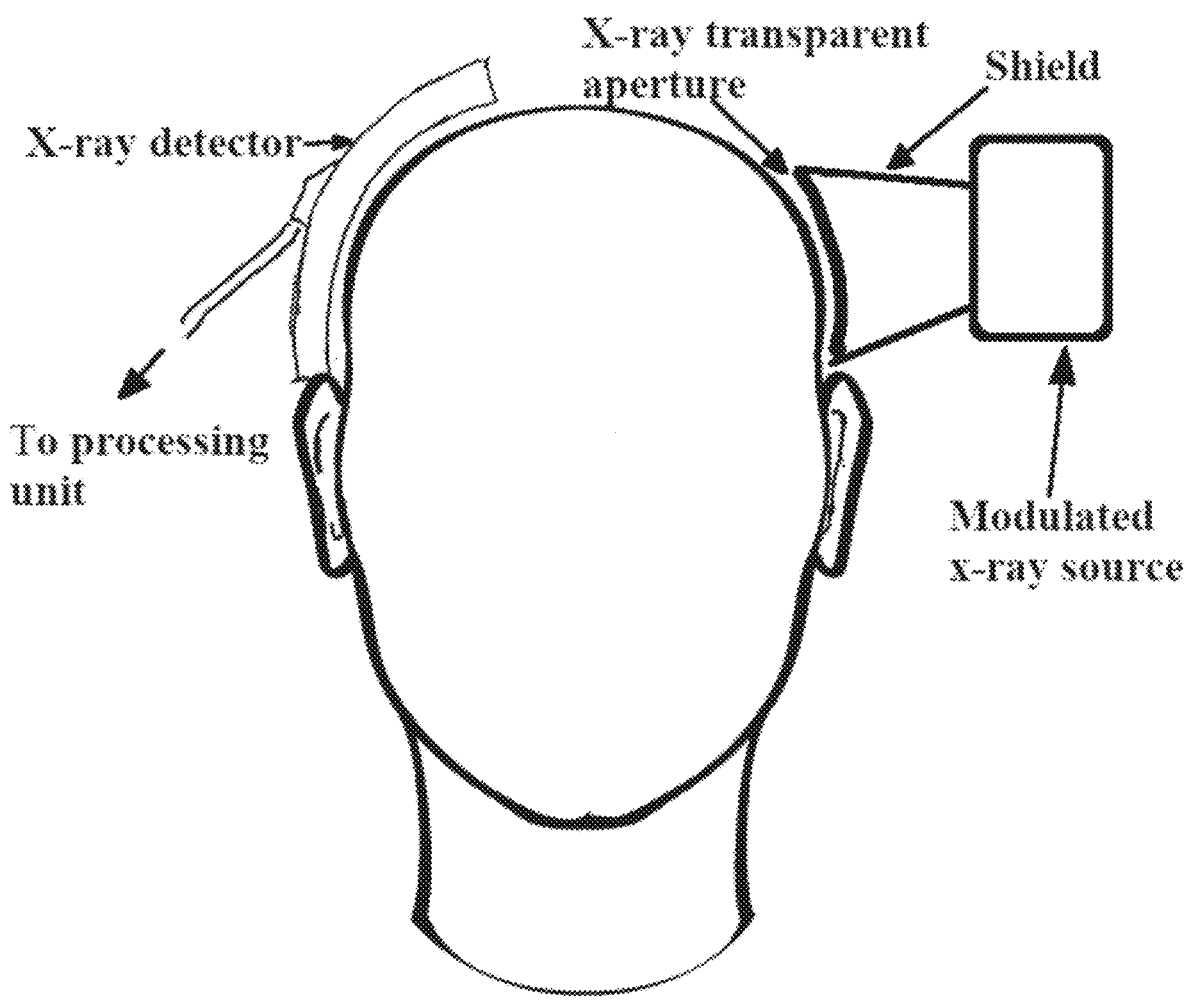
FIG. 11 shows a schematic of a modulated X-ray source being used in a front view brain X-ray system, according to an embodiment of the subject invention. The X-ray aperture can illuminate the brain with either a linear aperture or an area aperture. The X-ray detector can be either a linear sensor or an area type sensor. In the case of a linear sensor, it can be physically scanned by moving in space.

FIGS. 9-11 show schematic view of X-ray systems implementing a modulated X-ray source, according to embodiments of the subject invention. FIG. 9 shows a schematic of a modulated X-ray source being used for a front X-ray of a breast. The breast can be compressed between the detector and the source (it is depicted as uncompressed in FIG. 9 for clarity). The shield permits larger area exposure while reducing extraneous exposure to the patient. FIG. 10 shows a schematic of a modulated X-ray source being used for a lateral X-ray of a breast. The image speed can be, for example 10,000 frames per second, with modulation at, for example, 130 Hz (or about 130 Hz) sine wave intensity. FIG. 11 shows a schematic of a modulated X-ray source being used in a front view brain X-ray system. The X-ray aperture can illuminate the brain with either a linear aperture or an area aperture. The X-ray detector can be either a linear sensor or an area type sensor. In the case of a linear sensor, it can be physically scanned by moving in space.

Embodiments of the subject invention provide systems and methods for X-ray imaging using intensity modulated X-rays. Embodiments also provide a modification to an X-ray tube to permit grid-based intensity modulation and a masking scheme for sub-pixels to increase the dynamic range of the resulting pixels. Embodiments of the subject invention increase the SNR of X-ray imaging systems (compared to such systems without the intensity modulated X-ray source) by reducing the effective bandwidth of the system, thereby reducing the noise power. Four different detection and demodulation topographies can be used. In addition, a grid or screen modulated X-ray tube and/or sub-pixels to increase the dynamic range of a single pixel by masking and reducing the sensitivity of the sub-pixels can be used. The sub-pixel masking can allow for the use of lower bit depth A/D converters to achieve higher dynamic ranges, thereby improving dynamic range and/or increasing conversion speed.

Embodiments of the subject invention advantageously allow greater dynamic range and reduce noise in X-ray images, thereby permitting the imaging of softer tissues than normal in an X-ray or computed tomography (CT) scanning system with significantly higher resolution than a magnetic resonance imaging (MRI) system while also achieving much greater throughput without the need for large magnets and magnetically shielded rooms. Such scans can take seconds whereas an MRI requires tens of minutes.

By reducing the noise, the SNR can be greatly enhanced. In addition, the contrast can be improved and/or exposure times can be reduced. The reduction in bandwidth can be effectively determined by the native photodetector (X-ray detector) pixel bandwidth, which can be, for example, on the order of hundreds of kHz or greater and the desired filter bandwidth of the AM demodulator or DSP device. Bandwidths of well under 10 Hz are easily attainable in a DSP for a 13 kHz modulation frequency. This can lead to a reduction in the noise by at least 20 dB or a factor of 100.

Because systems and methods of embodiments of the subject invention are X-ray based and not a magnetic field-based, the imaging can be used in real time to guide laparoscopic and arthroscopic style surgical instruments for more precise and less disruptive surgical techniques. This can greatly improve the removal of cancers (e.g., from the breast and/or brain) as the incisions would be small and the surgical margins both precise and greatly reduced.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for X-ray imaging, the system comprising:
an X-ray detector; and
an X-ray source configured to provide X-rays towards the X-ray detector,
the X-ray source being further configured to modulate an amplitude of intensity, of the X-rays provided, at a predetermined frequency, and
the predetermined frequency being in a range of from 100 Hertz (Hz) to 20 megahertz (MHz).

2. The system according to claim 1, further comprising an analog-to-digital (A/D) converter in operable communication with the X-ray detector and configured to convert a signal received by the X-ray detector to a digital signal.

3. The system according to claim 2, further comprising a narrow band filter in operable communication with the X-ray detector and configured to filter the signal received by the X-ray detector before it is converted by the A/D converter.

4. The system according to claim 3, further comprising a multiplier in operable communication with the narrow band filter and configured to multiply the signal received by the X-ray detector before it is converted by the A/D converter and after it is filtered by the narrow band filter.

5. The system according to claim 3, the narrow band filter being centered at the predetermined frequency.

6. The system according to claim 2, further comprising a digital signal processor in operable communication with the A/D converter and configured for asynchronous demodulation of the digital signal.

7. The system according to claim 2, further comprising a digital signal processor in operable communication with the A/D converter and configured for synchronous demodulation of the digital signal.

8. The system according to claim 1, the predetermined frequency being a range of from 130 Hz to 10 MHz.

9. The system according to claim 1, the X-ray source comprising an increased dynamic range pixel that comprises a plurality of masked sub-pixels each masked differently from each other.

10. A method for X-ray imaging, the method comprising:
providing X-rays through a subject and towards an X-ray detector using an X-ray source; and
modulating an amplitude of intensity, of the X-rays provided, at a predetermined frequency while providing the X-rays,
the predetermined frequency being in a range of from 100 Hertz (Hz) to 20 megahertz (MHz).

11. The method according to claim 10, further comprising using an analog-to-digital (A/D) converter in operable communication with the X-ray detector to convert a signal received by the X-ray detector to a digital signal.

12. The method according to claim 11, further comprising filtering the signal received by the X-ray detector, using a narrow band filter, before it is converted by the A/D converter,
the narrow band filter being centered at the predetermined frequency.

13. The method according to claim 12, further comprising multiplying the signal received by the X-ray detector, using a multiplier, before it is converted by the A/D converter and after it is filtered by the narrow band filter.

14. The method according to claim 11, further comprising using a digital signal processor to asynchronously demodulate the digital signal.

15. The method according to claim 11, further comprising using a digital signal processor to synchronously demodulate the digital signal.

16. The method according to claim 11, the X-ray source comprising an increased dynamic range pixel that comprises a plurality of masked sub-pixels each masked differently from each other.

17. A system for X-ray imaging, the system comprising:
an X-ray detector;
an X-ray source configured to provide X-rays towards the X-ray detector; and
an analog-to-digital (A/D) converter in operable communication with the X-ray detector and configured to convert a signal received by the X-ray detector to a digital signal; and
at least one of:
a) a narrow band filter in operable communication with the X-ray detector and configured to filter the signal received by the X-ray detector before it is converted by the A/D converter, the narrow band filter being centered at the predetermined frequency;
b) a digital signal processor in operable communication with the A/D converter and configured for either asynchronous demodulation of the digital signal or synchronous demodulation of the digital signal,
the X-ray source being further configured to modulate an amplitude of intensity, of the X-rays provided, at a predetermined frequency,
the predetermined frequency being in a range of from 130 Hertz (Hz) to 10 megahertz (MHz), and
the X-ray source comprising an increased dynamic range pixel that comprises a plurality of masked sub-pixels each masked differently from each other.

18. The system according to claim 17, comprising the narrow band filter,
the system further comprising:
an amplifier in operable communication; and
a multiplier in operable communication with the narrow band filter and configured to multiply the signal received by the X-ray detector before it is converted by the A/D converter and after it is filtered by the narrow band filter.

19. The system according to claim 17, comprising the digital signal processor,
the digital signal processor being configured for asynchronous demodulation of the digital signal.

20. The system according to claim 17, comprising the digital signal processor,
the digital signal processor being configured for synchronous demodulation of the digital signal.

* * * * *